(12) United States Patent
Ohzu et al.

(10) Patent No.: US 6,416,898 B1
(45) Date of Patent: Jul. 9, 2002

(54) FUEL CELL COMPRISING AN INORGANIC GLASS LAYER

(75) Inventors: Hideyuki Ohzu; Norihiro Tomimatsu; Yoshihiro Akasaka; Kazuhiro Yasuda; Masahiro Takashita, all of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/531,525

(22) Filed: Mar. 21, 2000

(30) Foreign Application Priority Data

Mar. 31, 1999 (JP) .......................................... 11-093894

(51) Int. Cl.[7] .................................................. H01M 8/10
(52) U.S. Cl. ............................................. 429/33; 429/41
(58) Field of Search ............................... 429/15, 30, 33, 429/41, 44

(56) References Cited

U.S. PATENT DOCUMENTS 3,859,139 A * 1/1975 Dews et al. ................. 136/120
4,240,882 A * 12/1980 Ang et al. ..................... 204/75
5,094,927 A * 3/1992 Baucke et al. ................. 429/33

FOREIGN PATENT DOCUMENTS

JP 8-119612 5/1996

OTHER PUBLICATIONS

Masayuki Nogami, et al. "Fast Protonic Conductors of Water–Containing $P_2O_5$–$ZrO_2$–$SiO_2$ Glasses," J. Electrochem. Soc., vol. 144, No. 6, Jun. 1997, pp. 2175–2178.

* cited by examiner

Primary Examiner—Patrick Ryan
Assistant Examiner—M. Wills
(74) Attorney, Agent, or Firm—Oblon, Spivak, McClelland, Maier & Neustadt, P.C.

(57) ABSTRACT

The invention provides a fuel cell in which humidification control for maintaining adequate moisture in electrolyte membranes can be simplified. The fuel cell according to the invention is provided with a unit cell comprising a laminate of a plurality of power generation sections, each power generation section comprising a fuel electrode (anode), an oxidant electrode(cathode) and an electrolyte membrane interposed between the fuel electrode and the oxidant electrode(cathode), wherein the electrolyte membrane consists of a laminate comprising a film made of a proton-conducting organic compound, and a film made of a proton-conducting inorganic glass provided at least on the surface of the film of the proton-conducting organic compound facing the fuel electrode(anode).

19 Claims, 5 Drawing Sheets

FUEL CELL COMPRISING AN INORGANIC GLASS LAYER

BACKGROUND OF THE INVENTION

1. Field of the Invention

This invention relates to a Hydrogen-oxygen fuel cell.

2. Description of the Related Art

Hydrogen-oxygen fuel cells are known as a power generating system in which the sole reaction product is in principle water, thereby exerting little undesirable influences on the environment of the earth. In particular, research into fuel cells which have a solid polymer electrolyte made of perfluorosulfuri aci[0084] cation-exchang[0085] resi[008e] is greatly advancing in recent years. Consequently, fuel cells of this type are achieving compact and higher output, and are expected to be put into practical application as the power source of motor vehicles.

The electrolyte membrane of polymer electrolyte fuel cell (PEFC) is made generally of a film of proton-conducting ion exchange resin having a thickness between 50 and 200 $\mu$m In particular, an ion exchange membrane made of a perfluorocarbon polymer having sulfuric acid groups is known to have excellent fundamental properties and is widely investigated. Japanese Patent Disclosure (Kokai) No. 8-119612 discloses an inorganic proton-conducting film made of unhydrated molybdic acid, which has greater durability than the polymer electrolyte membrane.

The polymer electrolyte fuel cell has gas diffusing electrode layers on both surfaces of the electrolyte membrane. Electric power is generated by the reaction between a gaseous fuel such as hydrogen or a liquid fuel such as methanol supplied to one of the electrode layer and oxidizers such as oxygen or air to the other electrode layer. In order to improve the output of this type of fuel cell, enhancement of the catalytic activity of the electrode, improvement of gas-diffusion electrode properties, reduction of ohmic losses, and suppression of electrolyte membrane degradation etc. have been attempted. The ohmic losses include losses due to the resistance of conductive materials, contact resistance and film resistance. The degradation of the electrolyte membrane includes the physical destruction of the membrane due to the vaporization of water in the electrolyte membrane and the increase of membrane resistance.

On the other hand, attempts are also made to make fuel cell systems smaller in order to employ fuel cells as a long life power source of portable equipment. In such fuel cell systems, size reduction of attachments including humidifiers and reformers are being considered.

The resistance of the ion exchange membrane tends to become smaller when the water content therein is higher, the concentration of the ion exchange group in the membrane is higher or the membrane thickness is smaller. The water content of the membrane changes with the humidity of supplied gases while the concentration of the ion exchange group of commercially available ion exchange membranes is limited. Hence it is sometimes attempted to reduce the losses due to membrane resistance by a relatively simple way of employing the membranes having smaller thickness.

However, when the thickness of the ion exchange membrane is reduced, the life of the membrane will become shorter because the strength of the membrane itself and the water content in the membrane are reduced. Japanese Patent Publication No. 5-75835 and No. 6-10277 disclose a process for improving the size stability and mechanical strength of an ion exchange membrane in the case when the membrane is made thinner to reduce the membrane resistance, wherein a reinforced ion exchange membrane is produced by impregnating a tetrafluoroethylene (PTFE) film with perfluorocarbon ion exchange resin. However, this process yields only unsatisfactory results.

In case a solid polymer ion exchange membrane is employed as the electrolyte membrane, it is known that proton migration from the fuel electrode (anode) to the oxidant electrode (cathode) is accompanied by the migration of water contained in the membrane. Moreover, heat is generated by the reaction in which protons are formed from the fuel gas on the fuel electrode, thereby causing local reduction of the mechanical strength of the electrolyte membrane gradually during long-term operation. This leads to the degradation of the electrolyte membrane, thus decreasing the power output of the fuel cell.

Generally, fuel cells which employ polymer ion exchange membranes as the electrolyte membranes thereof have a means to maintain the moisture of the electrolyte membranes in order to suppress the degradation of the electrolyte membranes. An example of such a means is a device to humidify fuel so that the moisture of the electrolyte membrane is adequately controlled. However, such a moisture maintaining mechanism occupies an excessively large volume compared with the fuel cell itself, thereby hindering the manufacture of more compact fuel cells.

SUMMARY OF THE INVENTION

Accordingly, it is an object of the present invention is to provide a fuel cell which can be made smaller in size by simplifying the moisture control of the electrolyte membrane.

On the other hand, fuel cells in which liquid or gaseous methanol is supplied directly to the fuel electrode without using a reformer have such problems that part of methanol to be used as fuel permeates during the fuel cell operation into the electrolyte membrane, thereby causing the swelling of the electrolyte membrane, or that part of methanol reaches the oxidant electrode and reacts directly with the oxidizer, thus causing the ineffective burning problem of the fuel, which is called methanol crossover.

Thus it is another object of this invention to provide a fuel cell having improved output performance wherein the degradation of the electrolyte membrane is suppressed by inhibiting the permeation of the liquid fuels such as methanol into the electrolyte membrane.

It is yet another object of this invention to provide a fuel cell of high performance and a small-size by forming proton-conducting connection paths within the catalyst layer in electrodes.

According to sections, each power generation section comprising a fuel electrode, an oxidant electrode, and an electrolyte membrane interposed between the fuel electrode and the oxidant electrode;

wherein the present invention, there is provided a fuel cell which comprises; a unit cell comprising a plurality of stacked power generation the electrolyte membrane consists of a laminate comprising a film made of a proton-conducting organic compound, and a film made of a proton-conducting inorganic glass provided at least on the surface of the film of the proton-conducting organic compound facing the anode.

In a preferred embodiment of the fuel cell of this invention, the films made of a proton-conducting inorganic glass are provided on both surfaces of the film of the proton-conducting organic compound, wherein the films of the proton-conducting inorganic compound have a porous structure, the pores on the surface contacting the fuel electrode preferably having a smaller average dimension than the pores on the surface contacting the oxidant electrode.

According to the present invention, there is further provided a fuel cell which comprises; a unit cell comprising a plurality of stacked power generation sections, each power generation section comprising a fuel electrode, an oxidant electrode, and an electrolyte membrane interposed between the fuel electrode and the oxidant electrode;

wherein the electrolyte membrane consists of a film made of a proton-conducting inorganic glass.

In a preferred embodiment of the fuel cell of this invention, the electrolyte membrane consisting of a film made of a proton-conducting inorganic glass has a larger number of pores on the surface contacting the oxidant electrode than on the surface contacting the fuel electrode.

According to the present invention, there is further provided a fuel cell which uses liquid fuels for power generation and comprises; a unit cell comprising a plurality of stacked power generation sections, each power generation section comprising a fuel electrode, an oxidant electrode, and an electrolyte membrane interposed between the fuel electrode and the oxidant electrode;

wherein the catalytic layers of the fuel electrode and oxidant electrode contacting the electrolyte membrane have a plurality of catalyst particles and proton-conducting particles, which catalyst particles are connected electrically by the proton-conducting particles.

In a preferred embodiment of the fuel cell of this invention, the proton-conducting particles are inorganic proton-conducting particles.

In a preferred embodiment of the fuel cell of this invention, the electrolyte membrane is made of an inorganic proton-conducting glass.

DETAILED DESCRIPTION OF THE PREFERRED EMBODIMENTS

The details of the present invention will be hereinafter described by using illustrated embodiments.

The fuel cell according to the present invention has two different configurations as mentioned in the following.
1) Fuel cell

In one embodiment of the present invention, the fuel cell has a unit cell comprising a plurality of stacked power generation sections, each power generation section comprising a fuel electrode, an oxidant electrode, and an electrolyte membrane interposed between the fuel electrode and the oxidant electrode;

wherein the electrolyte membrane consists of a laminate comprising a film made of a proton-conducting organic compound, and a film made of a proton-conducting inorganic glass provided at least on the surface of the film of the proton-conducting organic compound facing the fuel electrode.

Figure 1:
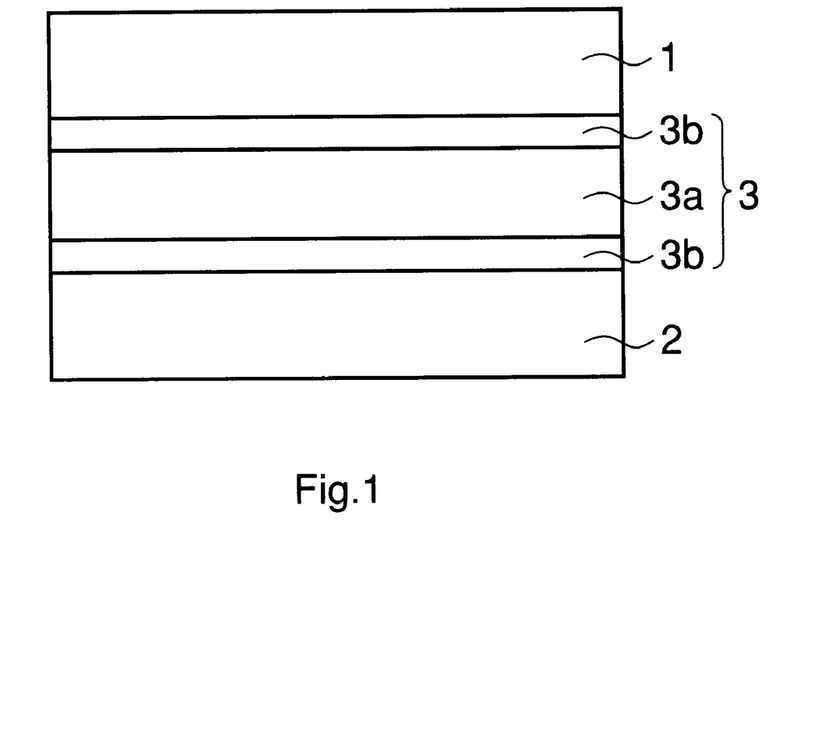
FIG. 1 shows a cross-sectional view showing one embodiment of the power generation section of the fuel cell according to the present invention.

In the fuel cell according to the embodiment of the present invention, it is more preferable to dispose a proton-conducting inorganic glass film also on the surface of the organic compound film facing the oxidant electrode. Such power generation section is shown in FIG. 1, wherein a fuel electrode 1 (catalyst impregnated carbon) an oxidant electrode 2 (catalyst impregnated carbon), and an electrolyte membrane 3 interposed between the electrodes 1 and 2 constitute the power generation section. The electrolyte membrane 3 is composed of a laminate having a proton-conducting organic compound film 3a in the middle, a proton-conducting inorganic glass film 3b adjacent to the fuel electrode 1 and another proton-conducting inorganic glass film 3b adjacent to the oxidant electrode 2.

In a preferred embodiment of this invention, the proton-conducting organic compound is made of a fluorocarbon polymer having positive-ion exchange groups including sulfuric acid groups and carbonic acid groups. Preferably, the fluorocarbon polymer is a copolymer of $CF_2=CF_2$ and a fluorovinyl compound represented by a general formula of $CF_2=CF_2(OCF_2CFX)_m-O_p-(CF_2)_n-A$, wherein m is an integer from 0 to 8, n is an integer from 0 to 12, p is 0 or 1, X represents F or $CF_3$, and A represents a $SO_3H$ group, a COOH group or its precursor functional groups.

Preferable examples of the above fluorovinyl compounds are listed below:

The above fluorocarbon copolymer may include perfluoroolefins such as hexafluoropropylene and chlorotrifluoroethylene, or perfluoroalkylvinylether.

The ion exchange membrane may be reinforced by a fluorocarbon copolymer manufactured as fibril, fibrous, or non-woven fabrics.

Preferably, the proton-conducting organic compound film has a thickness between 5 and 150 μm. The proton-conducting inorganic glass is selected from the group of glass-forming oxides such as $P_2O_5$, $SiO_2$, $B_2O_3$, $GeO_2$, or $As_2O_3$, glass intermediate oxides such as the oxides of such metals as Al, Ga, Sc, Ti, Zr, Y. V, W, Nb, Mo, In, Sn, Fe, Sb, Bi, Pb, Th, Se, lanthanoids, Ni, Cr, Co, Zn, Cu, Ag, Pd, Hf, Ta, Te, Po, Tl, or Cd, the oxides of alkali metals, the oxides of alkaline earth metals, the oxides of high-valence ions, and the mixtures of these metal oxides. By using the materials like these, the advantages can be obtained in that the proton conductivity can be improved and the endurance (chemical resistance) of the glass compositions ($SiO_2$—$P_2O_5$-based) can be enhanced.

The proton-conducting inorganic glasses are prepared, for example, by the sol-gel method.

The glasses are prepared, for example, by hydrolysis of a mixture of solutions of metal alcoholates (metal alkoxides), thereby causing gelation and formation of a wet gel, a dry gel or a glass film. The inorganic glasses may have any of these three forms, but the most preferable material from the viewpoint of the mechanical strength and the stability of the material is a glass-like film obtained by the heat-treatment of the gels.

Preferably, the inorganic glass film has a porous structure. In this porous inorganic film, it is preferable that the surface of the first inorganic glass film facing the fuel electrode has smaller pore sizes, that is, the surface is composed of gel or glass having tiny pores, whereas another surface of the second inorganic glass film facing the oxidant electrode has larger pore sizes. This is because the permeation of the fuels (particularly in the case of the liquid fuels) into the oxidant electrode can be suppressed by making dense the proton-conducting inorganic film facing the fuel electrode and this fact produces the effect that the drop of cell output due to fuel crossover (the above-mentioned methanol crossover in the case of a methanol fuel) can be suppressed.

Preferably, the surface having smaller pore sizes have pores ranging from 10 to 1,000 nm in diameter, the peak diameter of the pores being smaller than 500 nm, and the surface having larger pore sizes have pores ranging from 500 to 3,000 nm in diameter, the peak diameter of the pores being within the range of 500 and 1,000 nm. The reasons why the pore sizes are described thus, that is, the pores on the surface of the proton-conducting inorganic film facing the oxidant electrode have larger pore sizes than the pores on that facing the fuel electrode, are as follows:

(1) It is necessary for the inorganic film facing the oxidant electrode to have pores of a certain size for efficiently holding in the inorganic film the water produced on the side of the oxidant electrode, whereas it is necessary for the inorganic film facing the fuel electrode have pores of sufficiently small sizes to suppress fuel crossover, preferably of such sizes that the droplets used as the liquid fuel cannot permeate.

(2) In order that protons can be conveyed through the proton-conducting organic film interposed between the inorganic films, the organic film must contain some moisture. However, when power generation begins and protons are conveyed through the organic film, the content of moisture in the film decreases, thereby resulting in the fall of the conductivity. Therefore, it is necessary to always supply water to the film for keeping a high conductivity of the organic film. The water produced on the side of the oxidant electrode is used as the source of the water. It is necessary for the pores of the inorganic film facing the oxidant electrode to hold the water produced on the oxidant electrode and to have at least a certain degree of size for effectively refluxing it to the organic film.

Preferably, the pores on the surface of the inorganic glass film facing the fuel electrode are independent to each other whereas the pores on the surface of the inorganic glass film facing the oxidant electrode penetrate the film from one of the surfaces to the other.

The thickness of the inorganic glass film can be selected considering the thickness of the organic compound film (the ion-exchange membrane) and the surface area of the electrode facing the electrolyte membrane, and is preferably in a range of 1 to 70%, more preferably in a range of 3 to 50%, of the thickness of the ion exchange membrane. When the thickness of the inorganic glass film is made less than 1% of the thickness of the ion exchange membrane, it becomes difficult to maintain the moisture of the electrolyte membrane or suppress the permeation of methanol. When the thickness of the inorganic glass film exceeds 70% of the thickness of the ion exchange membrane, th[0085] resistanc[0085] of th[0085] electrolyt[0085] membran[0085] consisting of a solid polymer ion exchange membrane and at least one inorganic glass film may increase undesirably.

The thickness of the electrolyte membrane is not limited to a specific range, but is preferably less than 200 $\mu$m. The reasons why the thicknesses are so limited are as follows:

(1) It is required to reduce the total resistance of the electrolyte membrane (organic film plus inorganic film). (The higher the resistance, the larger the output loss.)

(2) When the thickness of the organic film exceeds a certain limit, it becomes impossible to uniformly supply the amount of water necessary for keeping a high proton conductivity even when the water produced on the side of the oxidant electrode is returned to the organic film or swelling of the organic film is increased by liquid fuels and water to break the inorganic film so that it becomes impossible to keep the impermeability to fuels of the inorganic film.

The best result is obtained when the thickness of the ion exchange membrane, which is made of an organic compound, is in a range of 5 to 150 $\mu$m. This limitation of the thickness is based on the fact that the preferred thickness of the organic film is 150 $\mu$m or less for the above described reasons (1) and (2).

The material of the fuel electrode and the oxidant electrode is not limited to specific substances, but, for example, a porous sheet of a water-repellent resin binder such as PTFE in which carbon black powder supporting platinum is dispersed can be used. This porous sheet may contain fine carbon particles coated with a sulfuric acid perfluorocarbon polymer.

The electrolyte membrane consisting of a laminate of an organic compound film (a polymer ion exchange membrane) and an inorganic glass film can be prepared, for example, by the following method. First, a film is prepared from one of an organic compound or an inorganic glass, and then the other substance is applied on the prepared film by painting, spraying or printing, and finally the prepared electrolyte membrane laminate is dried. The electrolyte membrane can also be prepared by preparing an inorganic glass film and an organic compound film separately and then laminating the prepared films to a single body by hot pressing at, for example, a temperature between 120 and 230° C. under a pressure between 5 and 30 kg/cm$^2$. In order to prepare the inorganic glass films having different pore diameter distributions on both surfaces of the organic compound film, the quantity of a drying inhibitor (e.g. formamide), or a catalyst (either acidic or basic) used in the preparation process is adjusted. When the inorganic glass film is prepared by the sol-gel method, the pore size of the inorganic glass film can be made larger by adding a larger quantity of a drying inhibitor such as formamide or a diluting solvent such as ethanol to a metal alcoholate mixture.

The above-mentioned fuel cell can be built, for example, by the following methods.

(a) A power generation section is built by bringing a gas diffusion fuel electrode and a gas diffusion oxidant electrode in contact with both surfaces of an electrolyte membrane consisting of a laminate of an organic compound film (a polymer ion exchange membrane) and an inorganic glass film, wherein the fuel electrode is disposed on the surface of the inorganic glass film and the oxidant electrode is disposed on the surface of the polymer ion exchange membrane. A plurality of completed power generation sections are then stacked interposing a current collector such as a sheet of carbon paper between adjacent power generation sections, thus forming a unit cell. A fuel cell is built by placing the unit cell between a pair of electrically conductive vessel frames in which channels for flows of fuel gases such as hydrogen gas or methanol and liquid fuels such as methanol are provided.

(b) Gas-diffusion electrodes made of a mixture of carbon supporting platinum and a sulfuric acid perfluorocarbon polymer are prepared by means of painting, spraying or printing on one or both surfaces of the above electrolyte membrane or of the current collector such as a sheet of carbon paper. Then the electrolyte membrane, gas-diffusion electrodes and current collectors are joined by hot pressing, for example, at a temperature between 120 and 350° C. under a pressure between 2 and 100 kg/cm$^2$, thus obtaining a unit cell consisting of a plurality of power generation sections. A fuel cell is built by placing the unit cell between a pair of electrically conductive vessel frames in which channels for flows of fuel gases such as hydrogen gas or methanol, liquid fuels such as methanol or oxidant gases such as oxygen or air are provided.

As described in the foregoing, the fuel cell according to this embodiment has a unit cell comprising a plurality of stacked power generation sections, each power generation section comprising a fuel electrode, an oxidant electrode, and an electrolyte membrane interposed between the fuel electrode and the oxidant electrode; wherein the electrolyte membrane is a laminate of a film made of a proton-conducting organic compound and a film made of a proton-conducting inorganic glass, which film made of a proton-conducting inorganic glass is disposed at least on the surface of the film of the proton-conducting organic compound facing the fuel electrode. According to this embodiment, a fuel cell of high performance is obtained in which a system for controlling the moisture of the electrolyte membrane is unnecessary and permeation of fuel such as methanol is prevented even when the thickness of the ion exchange membrane is reduced to minimize losses due to resistance.

That is, the mechanical strength of conventional electrolyte membranes, namely that of ion exchange membranes made of a fluorocarbon sulfuric acid polymer or a fluorocarbon carbonic acid polymer (solid polymer electrolyte membranes), deteriorates due to the rise of temperature or the decrease of the water content and temperature. The decrease of the water content in the electrolyte membrane is caused by the migration of water in the membrane to the oxidant electrode side by proton conduction. As a result, inhomogeneity of the water content in the electrolyte membrane arises, causing the degradation of the mechanical strength of the electrolyte membrane.

According to the present invention, water migration in the organic compound film (the solid polymer electrolyte membrane) caused by proton conduction and volatilization of moisture in the electrolyte is suppressed and the degradation of the electrolyte membrane is prevented by disposing a specific inorganic glass film having proton conductivity without water migration on the surface of a proton-conducting organic film (a solid polymer electrolyte membrane) facing the fuel electrode.

In particular, by providing very fine pores on the surface of the inorganic glass film facing the fuel electrode, that is, by preparing the inorganic glass film from gel or glass having minute pores, which are preferably open pores, the loss of water from, and the permeation of methanol through, the organic compound film (the solid polymer electrolyte membrane) can be effectively suppressed.

By disposing a proton-conducting inorganic glass film also on the surface of the organic compound film (the solid polymer electrolyte membrane) facing the oxidant electrode, water generated on the oxidant electrode during fuel cell operation can be returned efficiently to the electrolyte membrane. In particular, by providing pores having larger diameters on the surface of the inorganic glass film facing the oxidant electrode, water generated on the oxidant electrode can be refluxed more efficiently to the electrolyte membrane. Consequently, an attachment for keeping the moisture of the electrolyte membrane, which has been indispensable for conventional electrolyte membranes, becomes unnecessary and the fuel system can be made more compact.

Furthermore, when methanol is used as fuel in a fuel cell having conventional electrolyte membranes (polymer ion exchange membranes), methanol permeates from the fuel electrode to the oxidant electrode through the above electrolyte membrane and is oxidized directly on the oxidant electrode, thus causing the losses of fuel and power generation efficiency. Methanol permeation is a phenomenon caused by using a polymer material as electrolyte membranes.

By disposing a specific inorganic glass film on the surface of a proton-conducting organic compound film (a solid polymer electrolyte membrane) facing the fuel electrode and providing fine pores in the inorganic glass film in accordance with the present embodiment, methanol permeation is suppressed and fuel can be efficiently utilized. As a consequence, the present embodiment yields a high output fuel cell in which the ion exchange membrane can be made thinner without causing electrode short-circuits due to the deterioration of the electrolyte membrane. Further, the power loss by membrane resistance is reduced since fuel permeation is suppressed, thus realizing and efficient fuel combustion.

2) Fuel cell

Figure 2:
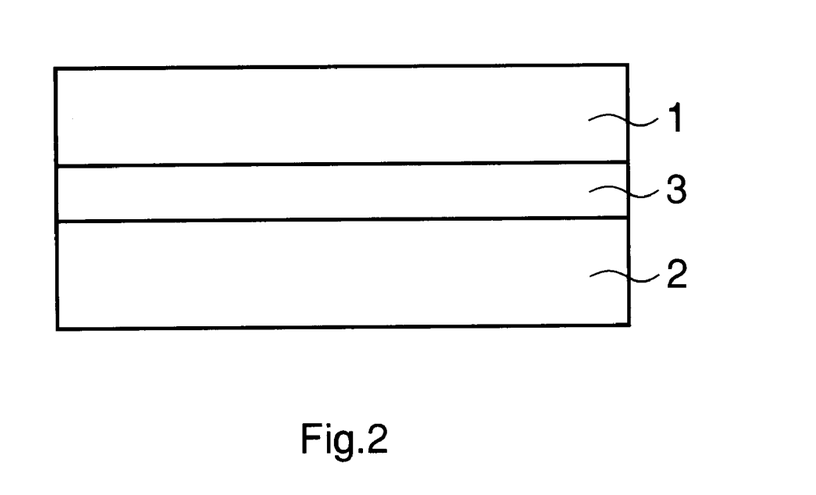
FIG. 2 shows a cross-sectional view of the power generation section of the fuel cell according to the present invention.

In another embodiment of the present invention shown in FIG. 2, the fuel cell has a unit cell comprising a plurality of stacked power generation sections, each power generation section comprising a fuel electrode, an oxidant electrode, and an electrolyte membrane made of an inorganic glass interposed between the fuel electrode and the oxidant electrode. An example of such a fuel cell is shown in FIG. 2, wherein the power generation section comprises, for example, a fuel electrode 1 (carbon supporting a catalyst), an oxidant electrode 2 (carbon supporting a catalyst) and an electrolyte membrane 3 made of a proton-conducting inorganic glass interposed between the fuel electrode and the oxidant electrode.

As the proton-conducting inorganic glass, the same material as described in the foregoing paragraph 1 is used.

Preferably, the surface of the above electrolyte membrane facing the oxidant electrode has pores with smaller diameters (gel or glass having minute pores) whereas another surface of the electrolyte membrane facing the oxidant electrode has pores with larger diameters. Preferably, the surface having smaller pore sizes have pores ranging from 10 to 1,000 nm in diameter, and the above-mentioned surface having larger pore sizes have pores ranging from 500 to 3,000 nm in diameter. In the above-mentioned electrolyte membrane, it is preferable that the pores on the surface facing the fuel electrode are independent to each other, whereas the pores on the surface facing the oxidant electrode are penetrating the membrane from one of the surfaces to the other.

The electrolyte membrane made of the inorganic glass film having different pore size distributions and pore volume on the surface facing the fuel electrode and on the surface facing the oxidant electrode can be prepared by joining a plurality of inorganic glass films having different pore size distributions and pore volume prepared in advance, or by continuously preparing a laminate of inorganic glass films having different pore size distributions.

Inorganic glass films having various pore size distributions can be prepared by controlling the amount of the drying inhibitor (e.g. formamide), or by controlling the amount of the catalyst either acidic or basic by controlling the amount of the diluting solvent such as ethanol. When an inorganic glass film having pores are prepared by the sol-gel method, pores can be made larger by adding a larger amount of the drying inhibitor such as formamide to a mixed metal alcoholate solutions.

The thickness of the electrolyte membrane is not limited to a specific value, but the preferable thickness is below 200 $\mu$m.

The above-mentioned fuel cell can be built, for example, by the following methods.

(1) A power generation section is built by joining a gas diffusion fuel electrode on one surface of an electrolyte membrane made of a proton-conducting inorganic glass and a gas diffusion oxidant electrode on the other surface thereof. Then, a plurality of the power generation sections manufactured in the above-mentioned manner are stacked interposing a current collector such as a sheet of carbon paper between adjacent power generation sections, thus forming a unit cell. A fuel cell is built by placing the unit cell between a pair of electrically gases such as hydrogen gas or methanol and liquid fuels such as methanol are provided. (2) Gas diffusion electrodes made of a mixture of carbon supporting platinum and a sulfuric acid perfluorocarbon polymer are prepared by means of painting, spraying or printing on one or two surfaces of the above electrolyte membrane or the current collector such as a sheet of carbon paper. Then the electrolyte membrane, gas-diffusion electrodes and current collectors are joined by hot pressing at, for example, a temperature between 120 and 350° C. under a pressure between 2 and 100 kg/cm$^2$, thus obtaining a unit cell consisting of a plurality of power generation sections. A fuel cell is built by placing the above-mentioned unit cell between a pair of electrically conductive vessel frames in which channels for flows of fuel gases such as hydrogen gas, liquid fuels such as methanol or a mixture of methanol and water, or oxidant gases such as oxygen or air are provided.

As described in the foregoing, the fuel cell according to the present embodiment has a unit cell comprising a plurality of stacked power generation sections, each power generation section comprising a fuel electrode, an oxidant electrode, and an electrolyte membrane consisting of proton-conducting inorganic glass interposed between the fuel electrode and the oxidant electrode. This configuration prevents electrolyte film deterioration because the permeation of liquid fuels such as methanol into the electrolyte membrane is suppressed. Consequently, a fuel cell of high power output and reliability is obtained.

In particular, by applying an electrolyte membrane having very fine pores on the surface facing the fuel electrode (a surface composed of gel with minute pores) while having pores of larger diameters on the surface facing the oxidant electrode, a fuel cell is realized in which permeation of liquid fuels such as methanol can be more effectively prevented.

In the following, another embodiment of this invention is presented.

The fuel cell of this embodiment has a unit cell comprising a plurality of stacked power generation sections, each power generation section comprising a fuel electrode, an oxidant electrode, and an electrolyte membrane interposed between the fuel electrode and the oxidant electrode. In this fuel cell, liquid fuel is used as the source of energy. Both of the catalyst layers of the above-mentioned fuel electrode and oxidant electrode contacting the electrolyte membrane have a plurality of catalyst particles and proton-conducting particles, wherein the catalyst particles are connected electrically by the proton-conducting particles, that is, the proton-conducting particles are forming a network structure and serving as conductive paths which connect the catalyst particles with each other electrically.

Figure 3:
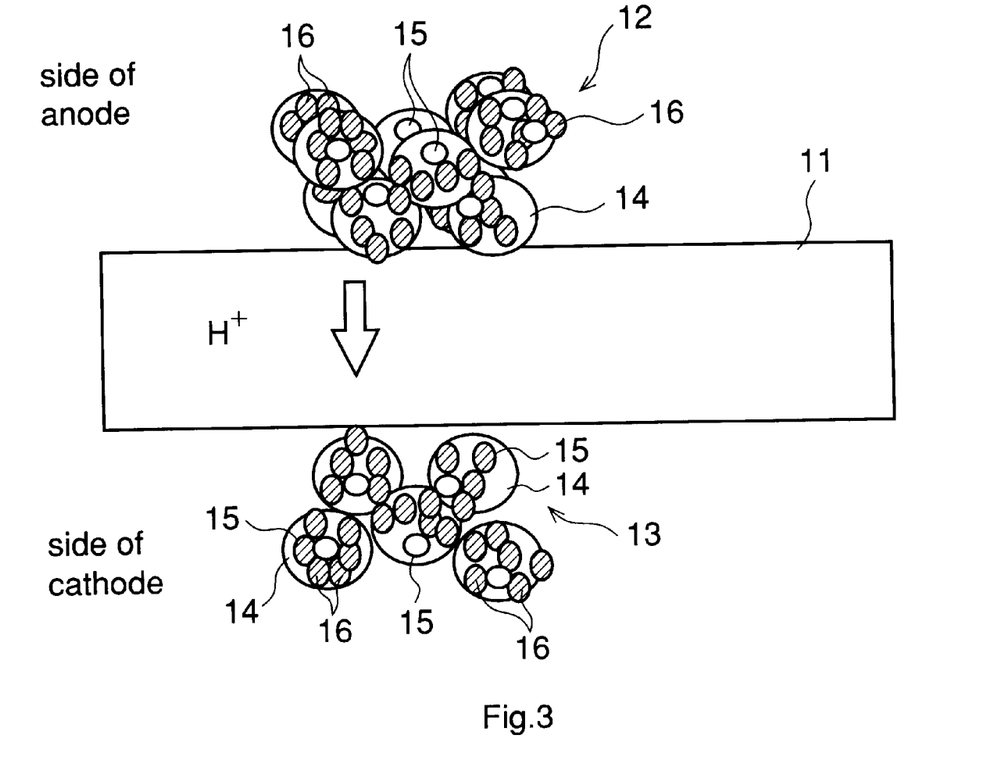
FIG. 3 shows a cross-sectional view showing still another embodiment of the power generation section of the fuel cell according to the present invention.
Figure 4:
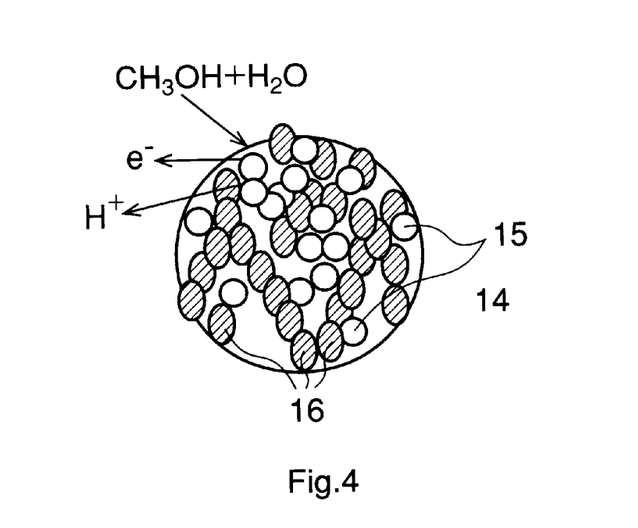
FIG. 4 shows an enlarged view of the catalytic layer shown in FIG. 3.
Figure 6:
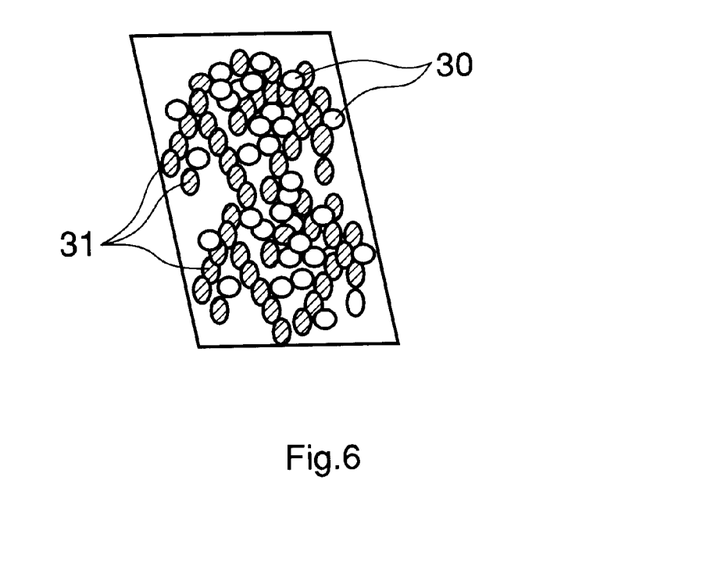
FIG. 6 shows an enlarged view of the catalytic layer shown in FIG. 5.

The above-mentioned power generation section has, for example, a structure shown in FIGS. 3, 4 and 6.

(1) Power generation section shown in FIGS. 3 and 4 The power generation section shown in FIG. 3 has a structure in which an electrolyte membrane 11 has catalyst layers 12 and 13 provided on the surfaces adjacent to the fuel electrode and the oxidant electrode, respectively, said catalyst layers 12 and 13 having a plurality of carrier particles 14 supporting on their surface a plurality of fine catalyst particles 15 and proton-conducting particles 16 electrically-connected to each other, wherein a plurality of the catalyst particles 15 on a single carrier particle 14 and a plurality of the catalyst particles 15 on a plurality of the carrier particles 14 are connected electrically by the proton-conducting particles 16. The electrolyte membrane is prepared, for example, from a proton-conducting inorganic glass. The inorganic glass is selected from the group of glass-forming oxides such as $P_2O_5$, $SiO_2$, $B_2O_3$, $GeO_2$, or $As_2O_3$, glass intermediate oxides such as the oxides of such metals as Al, Ga, Sc, Ti, Zr, Y, V, W, Nb, Mo, In, Sn, Fe, Sb, Bi, Pb, Th, Se, lanthanoids, Ni, Cr, Co, Zn, Cu, Ag, Pd, Hf, Ta, Te, Po, Tl or Cd, the oxides of alkali metals, the oxides of alkaline earth metals, the oxides of high-valence ions and mixtures of these oxides.

The carrier particles of the catalyst layers may be made, for example, of carbon. Preferably, these carrier particles have an average particle diameter between 0.01 and 0.2 $\mu$m. The catalyst particles of the fuel electrode side may be made, for example, of Pt-Ru or Pt-Sn. Preferably, these catalyst particles have an average particle diameter between 1 and 10 nm. The catalyst particles of the oxidant electrode side may be made, for example, of Pt. Preferably, these catalyst particles have an average particle diameter between 1 and 10 nm.

The proton-conducting particles are preferably prepared, for example, from glass-forming oxides such as $P_2O_5$, $SiO_2$, $B_2O_3$, $GeO_2$, or $As_2O_3$, glass intermediate oxides as the oxides of such metals as Al, Ga, Sc, Ti, Zr, Y, V, W, Nb, Mo, In, Sn, Fe, Sb, Bi, Pb, Th, Se, lanthanoids, Ni, Cr, Co, Zn, Cu, Ag, Pd, Hf, Ta, Te, Po, Tl or Cd, alkali metal oxides, alkaline earth oxides and the oxides of high-valence ions or mixtures of these oxides. Preferably, the proton-conducting particles have an average particle diameter between 1 and 20 nm.

Preferably, the proton-conducting particles coat more than 15% and less than 60% of the total surface of the carrier. This surface coating ratio can be controlled by repeating immersion of the carrier in a slurry containing the proton-conducting particles. When the ratio of coating by the proton-conducting particles is below 15%, it becomes difficult to keep good electrical conductivity between the catalyst particles, whereas when the ratio of coating by the proton-conducting particles is made greater than 60%, electron conduction may be hindered. The more preferable ratio of coating is between 15 and 40%.

Figure 5:
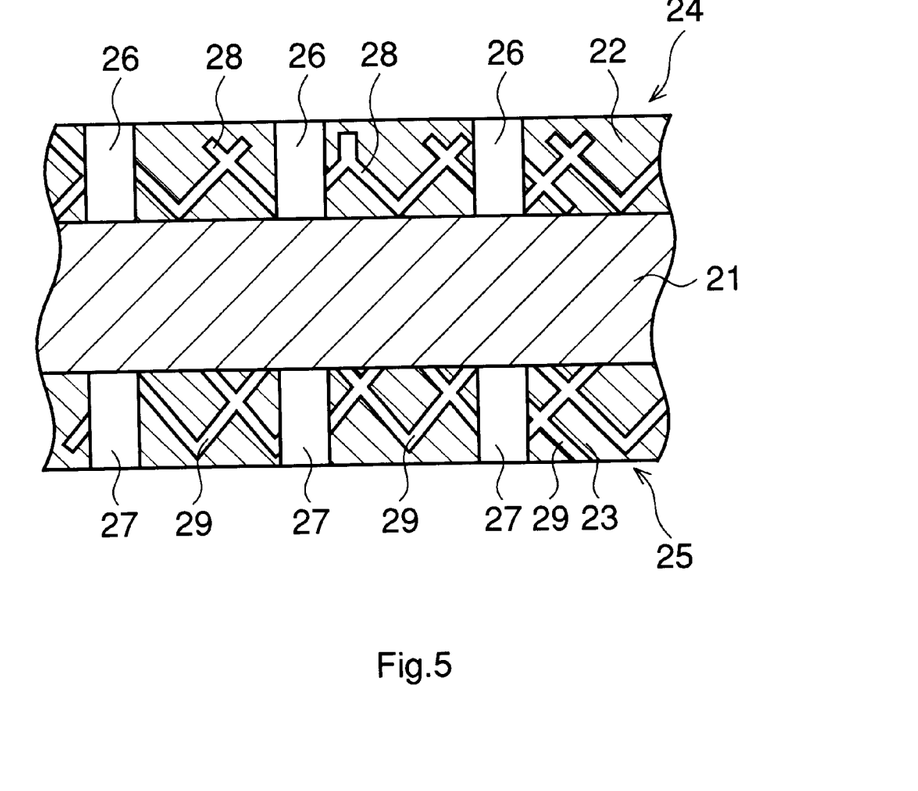
FIG. 5 shows a cross-sectional view showing still another embodiment of the power generation section of the fuel cell according to the present invention.

(2) Power generation section shown in FIGS. 5 and 6. The power generation section shown in FIG. 5 has a structure in which catalyst layers 24 and 25 having electron-conducting thin films 22 and 23 made, for example, of platinum are disposed on the surfaces of an electrolyte membrane 21 positioned adjacent to the fuel electrode and the oxidant electrode, respectively. The electron-conducting films 22 and 23 have a plurality of gas flow paths 26 and 27 having a dimension, for example, of several micrometers. The electron-conducting films 22 and 23 have also a plurality of sub-micron pores 28 and 29, respectively. As shown in FIG. 6, these pores 28 and 29 support a plurality of fine catalyst particles 30 and a plurality of fine proton-conducting particles 31 connected electrically with each other, thus forming electrical contacts between the catalyst particles 30 in the pores 28 and 29.

The electrolyte membrane, the catalyst particles on the fuel electrode side and on the oxidant electrode side and the coating ratio of the carrier by the proton-conducting particles are identical to those described in the foregoing article (1) As described in the foregoing, the fuel cell according to the present embodiment realizes high performance and a small size by using liquid fuels such as methanol and having catalyst layers disposed on the electrolyte membrane surfaces adjacent to the fuel electrode and the oxidant electrode, wherein the catalyst layers have a plurality of catalyst particles and a plurality of proton-conducting particles and the catalyst particles are electrically connected with each other by the proton-conducting particles.

The fuel cell according to the present invention represents a direct reforming methanol fuel cell in which liquid fuels such as methanol are reacted directly without using a reformer.

The following cell reactions proceed in fuel cells in which methanol is directly reformed on the electrode.

On the fuel electrode side:

$$CH_3OH + H_2O \rightarrow 6H^+ + CO_2 + 6e \tag{1}$$

On the oxidant electrode side:

$$6H^+ + 6e^- + (3/2)O_2 \rightarrow 3H_2O \tag{2}$$

On the fuel electrode side, a methanol molecule and a water molecule react in the presence of a catalyst such as Pt-Ru to yield six protons and six electrons. The yielded protons migrate through the electrolyte membrane from the catalyst layer of the fuel electrode side to the oxidant electrode side, and react with oxygen in the catalyst layer of the oxidant electrode side to yield water.

As the foregoing descriptions indicate, the catalyst layers of the fuel electrode and the oxidant electrode need not only to serve as the regions where electrons and protons are formed and consumed, respectively, but also to provide the paths through which the electrons and protons can migrate and reach the current collector and the electrolyte membrane.

Usually, the electron conductivity of the catalyst layer is maintained when the carrier of the catalyst is composed of a porous framework consisting of electron-conducting carbon particles. Further, the generation and migration of electrons on the catalyst is realized by depositing Pt or Pt-Runoble metal catalysts on the carbon carrier.

As indicated in formula (1), the catalyst of the fuel electrode must generate electrons and protons simultaneously and provide the electrons and protons with paths to the electrolyte membrane.

In conventional techniques to render catalyst layers proton-conducting, catalysts are immersed in an organic solution containing NAFION and then dried. A fuel cell in which catalysts treated in the NAFION solution are used have better performance than a fuel cell in which untreated catalysts are used. By the above treatment, however, only a partial and discontinuous film of NAFION is formed on the catalyst layer, thus causing the catalyst to work only inefficiently. In particular, when methanol is used as fuel, NAFION, which is an organic material, may be dissolved and separated from the catalysts by the strong dissolving power of methanol, thereby causing deterioration of the fuel cell performance. Further, when methanol is used as fuel, methanol may directly permeate the electrolyte membrane and reduce the open circuit voltage, thereby causing the degradation of fuel cell performance.

In the fuel cell according to the embodiment shown in FIG. 3, a network of proton-conducting particles 16 is formed on carbon carrier particles 14 and is utilized as the conductive path of the catalyst particles 15 so that protons generated on the carrier particles 14 can efficiently participate in the cell reaction. Further, by forming a proton-conducting path also between the carrier particles 14, a reforming process proceeds in all the parts of the catalyst layer, thereby achieving a high reforming efficiency. Consequently, in a methanol fuel cell of the direct reforming type, in which liquid fuels such as methanol are reacted directly in the fuel cell without using a reformer, efficiency improvement and size reduction can be achieved.

In particular, proton-conducting particles made of inorganic material such as $P_2O_5$—$SiO_2$ are hardly dissolved or separated from the catalyst layer even in the presence of liquid fuels such as methanol. Consequently, the performance of the fuel cell is further improved.

Moreover, as shown in FIG. 5, protons generated in the pores 28 and 29 of the electron-conducting films 22 and 23 made, for example, of platinum can be reacted efficiently by providing a network of proton-conducting particles 31 inside the pores 28 and 29 of the electron-conducting films 22 and 23 and utilizing the network as the electrically conductive path of the catalyst particles 30. Consequently, efficiency improvement and size reduction can be achieved in a direct reforming methanol fuel cell, in which liquid fuels such as methanol are reacted directly in the fuel cell without using a reformer.

This invention will be further explained with reference to the following preferred examples.

EXAMPLE 1

Dry resin particles made from a copolymer of $CF_2=CF_2$ and $CF_2=CFOCF_2CF(CF_3)O(CF_2)_2SO_2$ F having an ion exchange capacity of 1.1 milliequivalent/g were hydrolyzed in a mixed aqueous solution containing 30 wt % dimethylsulfoxide and 15 wt % potassium hydroxide, washed with water and then immersed in 1 N hydrochloric acid. Then the particles were washed and dried at 60° C. for 1 hour. The resultant copolymer particles were dissolved in ethanol, thereby obtaining an ethanol solution containing 5 wt % copolymer. This dispersion solution was applied on a glass plate, air-dried at room temperature for 1 hour and dried further at 80° C., thereby obtaining an ion exchange membrane for fuel cells (a solid polymer membrane) having a thickness of 50 μm.

A mixture of silicon tetra-methoxide, phosphorus trimethoxide and titanium tetra-i-propoxide was mixed with a water-ethanol mixed solution so that the molar ratio of the total metal alcoholate in the mixture to the water-ethanol mixed solution was 4 to 1. To the resultant solution was added a 1:1 ethanol-formamide mixed solution to obtain a mixed metal alcoholate solution. A glass substrate was immersed in the mixed metal alcoholate solution, and the solution was hydrolyzed by adding HCl (or ammonia) as a hydrolysis catalyst at room temperature to form a gel film on the glass substrate. The glass substrate was subsequently taken out from the solution and dried, thereby forming a dry gel film having a thickness of about 30 $\mu$m on the glass substrate.

The resultant dry gel film was heat-treated at a temperature of about 700° C. for 5 hours in air, thus forming a proton-conducting $P_2O_5$—$SiO_2$—$TiO_2$ inorganic glass film. Measurements of pore size distribution showed that the pore size of the glass film was distributed below 1000 nm with a peak at 500 nm. Then the inorganic glass film was laminated on a surface of the solid polymer membrane which was to face a fuel electrode, thereby obtaining an electrolyte membrane. A pair of 150 $\mu$m thick gas diffusion electrodes supporting 0.5 mg/cm$^2$ Pt, each gas diffusion electrode consisting of 60 wt % carbon black supporting platinum and 40 wt % mixed inorganic glass sol, were joined on both surfaces of the electrolyte membrane by hot pressing at a temperature of 150 degree of Centigrade under a pressure of 10 kg/cm$^2$ for 10 seconds.

The joined electrode and membrane assembly was built into a performance measurement cell and a discharge test was conducted at a current density of 0.5 A/cm$^2$ supplying dry hydrogen and air to the fuel electrode and the oxidant electrode, respectively, at a cell temperature of 80 degree of Centigrade. As a result, a terminal voltage of 0.69 V was obtained. No change of the output was observed during this test for more than 100 hours.

COMPARATIVE EXAMPLE 1

An electrode and membrane assembly was fabricated in the same manner as explained in Example 1 except that the electrolyte membrane employed in Example 1 was replaced by an electrolyte membrane comprising only the solid polymer membrane as described in Example 1. The resultant electrode and membrane assembly was built into a performance measurement cell and a discharge test was conducted in the same manner as explained in Example 1. After more than 100 hours of the test, the open circuit voltage was found to be too low to obtain output voltage. The examination of the electrode and electrolyte membrane assembly revealed that short circuits had been created inside the assembly.

EXAMPLE 2

A mixture of silicon tetra-methoxide, phosphorus tri-methoxide was mixed with a water-ethanol mixed solution so that the molar ratio of the total metal alcoholate to the water-ethanol mixed solution was 4 to 1. To the resultant solution was added an ethanol—formamide mixed solution in which the mixing ratio of ethanol and formamide was varied in a range of 3:1 to 1:1, thus obtaining five different mixed metal alcoholate solutions.

A glass substrate was immersed in each of the mixed metal alcoholate solutions successively, wherein the solution was hydrolyzed at room temperature by adding hydrochloric acid or ammonia as hydrolysis catalysts to form a gel film of a thickness of 20 $\mu$m on the glass substrate by hydrolysis. The coated glass substrate was subsequently taken out from the solution and dried, thereby forming a dry gel film having a thickness of about 100 $\mu$m. The resultant gel film was heat-treated at a temperature of about 700 degree of Centigrade for 5 hours in air to obtain an electrolyte membrane consisting of inorganic $P_2O_5$—$SiO_2$—$TiO_2$ glass and having different pore distributions on both surfaces. The resultant electrolyte membrane had a thickness of 50 $\mu$m. and the pore size was distributed below 500 nm on the fine surface and 500 to 2,000 nm on the porous surface.

A pair of 150 $\mu$m thick gas diffusion electrodes supporting 0.5 mg/cm$^2$ Pt, each gas diffusion electrode consisting of 60 wt % carbon black supporting platinum and 40 wt % mixed inorganic glass sol identical to the sol mentioned in Example 1, were joined on both surfaces of the above-mentioned electrolyte membrane by hot pressing at a temperature of 150° C. under a pressure of 10 kg/cm$^2$ for 10 seconds.

The resultant electrode and membrane assembly was built into a performance measurement cell so that the surface of the electrolyte membrane having finer pores was positioned adjacent to the fuel cell electrode while the surface having coarser pores was positioned adjacent to the oxidant electrode, and a continuous discharge test was conducted at a current density of 0.5 A/cm$^2$, supplying dry hydrogen and air to the fuel electrode and the oxidant electrode, respectively, at a cell temperature of 80 degree of Centigrade. The initial terminal voltage was 0.68 V and the voltage drop after 1,000 hours was about 5%.

COMPARATIVE EXAMPLE 2

A film of a dry resin made of a copolymer of $CF_2$=$CF_2$ and $CF_2$=$CFOCF_2CF(CF_3)O(CF_2)_2SO_2F$ having an ion exchange capacity of 1.0 milliequivalent/g was fabricated by extrusion at 220 degree of Centigrade. The thickness of the resultant film was 50 $\mu$m. The film was then hydrolyzed in a mixed aqueous solution containing 30 wt % dimethylsulfoxide and 15 wt % potassium hydroxide, washed with water and immersed in 1 N hydrochloric acid. The film was then washed with water and the four corners of the film were fixed to an appropriate jig. The film in this state was then subjected to a drying process at 60 degree of Centigrade for 1 hour, thus obtaining an ion exchange membrane (a solid polymer membrane).

An electrode and electrolyte membrane assembly was fabricated in the same manner as explained in Example 2 except that the electrolyte membrane employed in Example 2 was replaced by the solid polymer membrane obtained in the above. The electrode and electrolyte membrane assembly was built into a performance measurement cell and a continuous discharge test was conducted in the same manner as explained in EXAMPLE 2

As a result, a terminal voltage of 0.69 V was obtained, which is equivalent to that of Example 2. However, the terminal voltage started to drop rapidly after a lapse of 500 hours, thereby making it impossible to continue discharge at a current density of 0.5 A/cm$^2$. The examination of the electrode and membrane assembly revealed that a number of cracks were formed inside the electrolyte membrane.

EXAMPLE 3

A mixture of silicon tetra-methoxide, phosphorus tri-methoxide and titanium tetra-i-propoxide was mixed with a water-ethanol mixed solution so that the molar ratio of the total metal alcoholate in the mixture to the water-ethanol mixed solution was 4 to 1. To the resultant solution was added an ethanol—formamide solution in which the mixing ratio of ethanol and formamide was varied in a range of 3:1 to 1:1 thus obtaining five different mixed metal alcoholate solutions. A glass substrate was immersed in each of the mixed alcoholate solutions successively, wherein the solution was hydrolyzed at room temperature by adding HCl or ammonia as hydrolysis catalysts to form a gel film of a thickness of 20 µm on the glass substrate by hydrolysis. The coated glass substrate was subsequently taken out from the solution and dried, thereby forming a dry gel film having a thickness of about 100 µm. The resultant gel film was heat-treated at a temperature of about 700 degree of Centigrade for 5 hours in air to obtain an electrolyte membrane consisting of inorganic $P_2O_5$—$SiO_2$—$TiO_2$ glass and having different pore distributions on both surfaces. The resultant electrolyte membrane had a thickness of 50 µm and the pore size was distributed below 500 nm on the fine surface and 500 to 2,000 nm in the porous surface.

A pair of 150 µm thick gas diffusion electrodes supporting 0.5 mg/cm$^2$ Pt, each gas diffusion electrode consisting of 60 wt % carbon black supporting platinum and 40 wt % mixed inorganic glass sol identical to the sol mentioned in Example 1, were joined on both surfaces of the above-mentioned electrolyte membrane by hot pressing at a temperature of 150 degree of Centigrade under a pressure of 10 kg/cm$^2$ for 10 seconds.

The resultant electrode and membrane assembly was built into a performance measurement cell so that the surface of the electrolyte membrane having finer pores is positioned adjacent to the fuel cell electrode and the surface having coarser pores is positioned adjacent to the oxidant electrode, and a continuous discharge test was conducted at a current density of 0.5 A/cm$^2$, supplying a liquid consisting of 1:1 methanol-water mixture and air at a cell temperature of 80 degree of Centigrade. The initial terminal voltage was 0.68 V and the voltage drop after 1,000 hours was about 5%.

COMPARATIVE EXAMPLE 3

A film of a dry resin made of a copolymer of $CF_2$=$CF_2$ and $CF_2$=$CFOCF_2CF(CF_3)O(CF_2)_2SO_2F$ having an ion exchange capacity of 1.0 milliequivalent/g was fabricated by extrusion at 220 degree of Centigrade. The thickness of the resultant film was 50 µm. The film was hydrolyzed in a mixed aqueous solution containing 30 wt % dimethylsulfoxide and 15 wt % potassium hydroxide, washed with water and immersed in 1 N hydrochloric acid. The film was then washed with water and the four corners of the film were fixed to an appropriate jig. The film in this state was then subjected to a drying process at 60 degree of Centigrade for 1 hour, thus obtaining an ion exchange membrane (a solid polymer membrane).

An electrode and electrolyte membrane assembly was fabricated in the same manner as explained in Example 3 except that the electrolyte membrane employed in Example 3 was replaced by the solid polymer membrane obtained in the above. The electrode and electrolyte membrane assembly was built into a performance measurement cell and a continuous discharge test was conducted in the same manner as explained in Example 3.

As a result, a terminal voltage of 0.69 V was obtained, which is equivalent to that of Example 3. However, the terminal voltage started to drop rapidly after a lapse of 500 hours, thereby making it impossible to continue discharge at a current density of 0.5 A/cm$^2$. The examination of the electrode and electrolyte membrane assembly revealed that methanol had permeated into the fuel electrode.

EXAMPLE 4

First, carbon particles having a diameter of about 0.1 µm were immersed in a $P_2O_5$—$SiO_2$ solution and then dried. The immersion and drying processes were repeated several times to obtai[008e] carbon —$P_2O_5$—$SiO_2$ composite particles in which the coating ratio of the carbon particles by the $P_2O_5$—$SiO_2$ film amounted to 20% in terms of weight increase. A Pt-Ru catalyst was deposited on these composite particles from a solution to obtain composite catalyst particles. The composite catalyst particles were then applied on a carbon cloth, thereby obtaining a fuel electrode.

Figure 7:
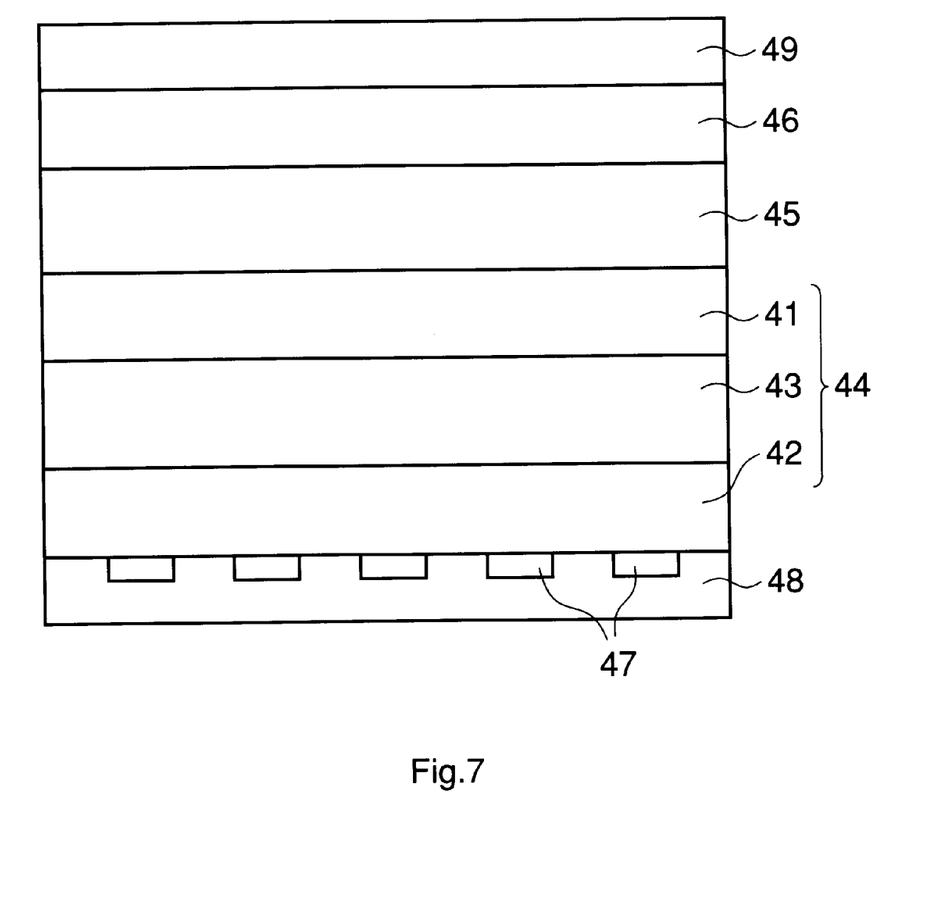
FIG. 7 shows a diagram of the construction of the power generation section of the methanol fuel cell mentioned in an embodiment according to the present invention.

On the other hand, a Pt black catalyst was deposited from a solution on the above-mentioned composite particles consisting of carbon and $P_2O_5$—$SiO_2$ to obtain composite catalyst particles. The composite catalyst particles were applied on a carbon cloth, thereby obtaining an oxidant electrode. Then, as shown in FIG. 7, a $P_2O_5$—$SiO_2$ electrolyte membrane 43 was interposed between the fuel electrode 41 (dimension: 32 mm times 32 mm), and the oxidant electrode 42 (dimension: 32 mm times 32 mm) so that the catalyst layers of the two electrodes came in contact with the electrolyte membrane 43. The resultant laminate was then joined by hot pressing at a temperature of 120 degree of Centigrade for 5 minutes under a pressure of 100 kg/cm$^2$, thereby obtaining a power generation section 44. A fuel-vaporizing plate 45 consisting of a porous plate of carbon having an average pore diameter of 100 µm and a porosity of 70% and a fuel permeating plate 46 consisting of a porous plate of carbon having an average pore diameter of 5 µm and a porosity of 40% are stacked on the fuel electrode 41 of the power generation section 44 in this order, and the resulting laminate was installed between a holder 48 on the oxidant electrode side having a plurality of oxidant gas supply channels 47 having a depth of 2 mm and a width of 1 mm and another holder on the fuel electrode side, thereby obtaining a unit cell having a reaction area of 10 cm$^2$.

Figure 8:
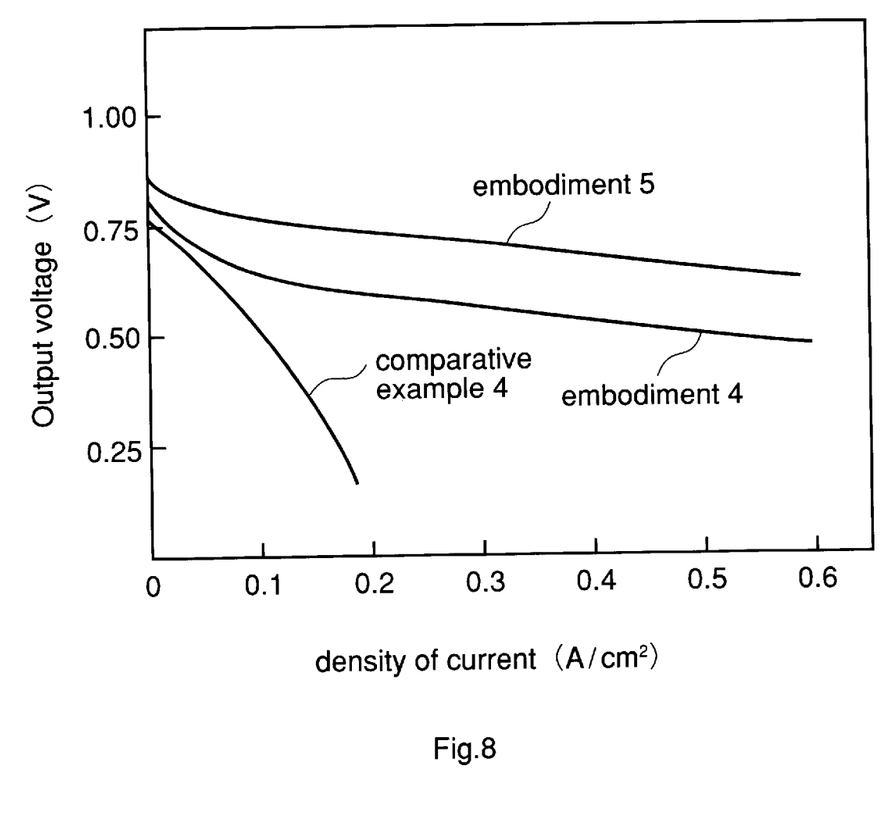
FIG. 8 shows a graph of the relationship between the current and the voltage of the fuel cells mentioned in Examples 4, 5 and Comparative example 4 according to the present invention.

A liquid fuel prepared by mixing methanol and water in a 1:1 molar ratio was fed from a side of the fuel permeating plate 46 of the unit cell by means of capillary attraction. As an oxidant gas, air having a pressure of 1 atm was supplied at a flow rate of 100 ml/min to the supply channel 47 of the holder 48 on the oxidant electrode side, and power was generated at 80 degree of Centigrade. The resultant current-voltage characteristics is shown in FIG. 8.

EXAMPLE 5

A $P_2O_5$—$SiO_2$ solution was impregnated under pressure onto a 10 µm thick Pt foil having pores of 0.2 µm in diameter. The foil thus obtained was then dried. This process of impregnation and drying was repeated several times, thereby forming connected paths of a $P_2O_5$—$SiO_2$ film inside the pores of the Pt foil. The resultant Pt foil was then placed in a solution containing a Pt-Ru catalyst, and catalyst particles were deposited in the foil pores by impregnating the Pt-Ru catalyst solution onto the Pt foil under pressure. Then the resultant foil was joined with a carbon cloth by applying pressure, thereby obtaining a fuel electrode.

Further, a Pt foil having connected paths of a $P_2O_5$—$SiO_2$ film in its pores was placed in a solution containing a Pt black catalyst, and catalyst particles were deposited in the pores of the foil by impregnating the Pt catalyst solution under pressure. The resultant foil is joined with a carbon cloth by applying pressure, thereby obtaining an oxidant electrode. The obtained fuel electrode (dimension: 32 mm times 32 mm) and the oxidant electrode (dimension: 32 mm times 32 mm) were employed to build a unit cell which was identical to Example 4 shown in FIG. 7 and has a reaction area of 10 cm$^2$. Power generation was performed on the resultant unit cell using the same condition as in Example 4, yielding the current-voltage characteristics shown in FIG. 8.

COMPARATIVE EXAMPLE 4

A Pt-Ru catalyst was deposited from a solution on carbon carrier particles, which were then coated on a carbon cloth.

The resultant cloth was immersed in a NAFION solution and then dried, thereby obtaining a fuel electrode.

Further, a Pt black catalyst was deposited from a solution on carbon carrier particles, which were then coated on a carbon cloth. The resultant cloth was immersed in a NAFION solution and then dried, thereby obtaining a oxidant electrode.

Then an electrolyte membrane made of perfluorsulfuric acid was interposed between the fuel electrode and the oxidant electrode, both having a dimension of 32 mm times 32 mm, so that the catalyst layers of the electrodes came in contact with the electrolyte membrane. The resultant laminate was joined by hot pressing at a temperature of 120 degree of Centigrade for 5 minutes under a pressure of 100 kg/cm$^2$, thereby obtaining a power generation section.

The resultant power generation section was used to build a unit cell having a reaction area of 10 cm$^2$ which is identical to the unit cell of Example 4 as shown in FIG. 7. Power generation was performed on the resultant unit cell using the same condition as in Example 4, yielding the current-voltage characteristics shown in FIG. 8.

The data in FIG. 8 show that the liquid fuel cells as indicated in Examples 4 and 5 supply stable output up to a current of about 5 A, whereas the liquid fuel cell of Comparative Example 4 shows a rapid output decrease with increasing currents, the available output current being only less than 2 A. The reason why the liquid fuel cell of Comparative Example 4 has only poor cell performance is that the activity of the electrode reaction between the liquid fuel and the fuel electrode is low. On the other hand, the fuel cells indicated in Examples 4 and 5 realize a highly active electrode reaction and maintain high performance with great stability also when the load is high.

As explained in the above, this invention provides a fuel cell of high power output and reliability which needs no system for controlling the moisture of the electrolyte membrane nor suffers the permeation of fuels such as methanol even when the thickness of the ion exchange membrane is made smaller in order to reduce the membrane resistance.

Further, this invention provides a fuel cell of high output performance in which the deterioration of the electrolyte membrane is reduced by suppressing the permeation of liquid fuels such as methanol into the electrolyte membrane.

Furthermore, this invention provides a direct reforming methanol fuel cell of high performance and compact size which is useful as the power source of small sized equipment. Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

EXAMPLE 6

An electrolyte plate was fabricated in the following manner. (Composition: 0.9 SiO$_2$/0.1 P$_2$O$_5$; mol %)

Silicon tetra-methoxide: 13.28 ml
Phosphorus trimethoxide: 2.30 ml
Water: 7.92 ml
Ethanol: 6 ml
Nafion/ethanol solution (Nafion content: 5%): 6 ml
Formaldehyde: 12 ml The above materials in the above proportions were mixed to prepare a metal alcholate mixed solution, which was then hydrolyzed by stirring it at room temperature for 1 hour to prepare a sol.

There was provided a polypropylene substrate having a hollow portion (dimension: 5 cm×5 cm and 30 $\mu$m in depth).

The hollow portion of the polypropylene substrate was filled with the above-obtained sol and kept as it is for 24 hours, thereby preparing a wet gel in the hollow portion. Thereafter, the wet gel was dried by raising its temperature stepwise from room temperature to 75° C., and, after drying it for 24 hours in total, a dry gel was obtained.

The pore diameter in the dry gel was measured with a mercury intrusion porosimetry and found to have an average pore diameter of 5 nm wherein the proportion of the pore diameter of 2 nm to 100 nm was 100%.

The dry gel was heat-treated(burned) at about 700° C. for 5 hours in air and then polished, thereby obtaining an electrolyte plate having a dimension of 3 cm×3 cm with 30 $\mu$m in thickness.

The porosity and OH group content of the above-obtained electrolyte plate were measured in the following manner.

First, the porosity of the electrolyte plate was measured with a mercury intrusion porosimetry and found to be 1%. Also, the water absorption was 0% or less.

Then, the electrolyte plate was dried at 75° C. under 30% RH for 5 hours to sufficiently remove the water therein and its weight was then measured. Next, the temperature of the electrolyte was raised from 30° C. to 1000° C. at 50° C./hr to release the OH groups. The weight of the electrolyte was then measured and it was found that the OH group content estimated from the weight loss was 2% or more.

Further, before and after the above temperature rise, the electrolyte was subjected to an infrared absorption analysis. As a result, it was confirmed that, while the transmittance in the 3300 to 2600 cm$^{-1}$ region was very low due to absorption by the OH groups before the temperature rise, the transmittance in the same wavenumber region remarkably increased. This fact reveals that the above decrease in weight is due to the release of the OH groups.

Furthermore, a 150 $\mu$m thick gas diffusion electrode carrying 0.5 mg/cm$^2$ consisting of 60 wt % of platinum-carrying carbon and 40 wt % of particles obtained by crushing a dry gel having the same composition as that used for preparing the above-mentioned proton-conducting film was joined on each of both surfaces of the above-mentioned electrolyte membrane by hot pressing at a temperature of 150° C. under a pressure of 10 kg/cm$^2$ for 10 seconds. The resultant joined assembly was built into a performance measurement cell, and a discharge test was conducted at a current density of 0.5 A/cm$^2$, supplying dry hydrogen and air to the anode and the cathode, respectively, at a cell temperature of 80° C. The open circuit voltage was 1.0V or more and the terminal voltage was 0.69V. Further, the test was continued under these conditions for more than 1 week, and no change in the cell output performance was observed. The proton conductivity of the electrolyte used in the above cell test was 5×10$^{-3}$S/cm.

COMPARATIVE EXAMPLE 5

An electrolyte plate was fabricated in the same procedure as in Example 6 except that the heat-treating temperature in the burning of the electrolyte membrane was changed to 500° C. in Example 6 and its characteristics were evaluated. As a result, the electrolyte plate so obtained had a porosity of 15% and an OH group content of 2%.

Also, the water absorption of the electrolyte was measured and found to be 20%.

The electrolyte plate was used to fabricate a joined assembly and a discharge test was conducted, in the same manner as in Example 6. The open circuit voltage was 0.7V and the terminal voltage was 0.4V. That the voltages were lower as compared with those in Example 6 seems due to be the increase in the resistance because of the porosity becoming higher and the occurrence of crossover. The proton conductance of the electrolyte used in the above cell test was $5 \times 10^{-3}$ S/cm. When the cell reaction was allowed to continue, a drop of the cell output and an increase of the resistance became observable after a lapse of 3 hours, and, after 1 day, the open electromotive force was found to be too weak to obtain output voltage. The proton conductivity at this time was $1 \times 10^{-7}$ S/cm. The electrolyte was investigated after completion of the test. As a result, the presence of innumerable cracks was confirmed and the electrolyte was found to contain substantially no water-containing component. Also, there were few OH groups in the glass. It is probable that the OH groups became more volatile because of the presence of pores.

EXAMPLE 7

A cell was fabricated in the same conditions as in Example 6 except that, as the fuel used in the cell test, a 1:1 methanol-water mixture was used in place of the dry hydrogen, and the open circuit voltage was measured. As a result, the open circuit voltage was 1.0V, and, when the test was continued for more than 1 week, no drop of the open circuit voltage was observed. The proton conductivity of the electrolyte used in the above cell test was $5 \times 10^{-3}$ S/cm.

EXAMPLE 8

An electrolyte was prepared in just the same procedure as in Example 6 except that an ethanol/Nafion solution was used and a cell was fabricated in the same conditions as in Example 6 except that, as the fuel used in the cell test, a 1:1 methanol-water mixed solution was used in place of the dry hydrogen,-and the open circuit voltage was measured.

The weight loss at the time of completing the drying in the step of preparing the dry gel was 90% based on the weight of the mixed solution. The heat treatment in the step of preparing the electrolyte from the dry gel was carried out at 1000° C. for 3 hours. The heat-treated electrolyte had a water absorption of 0%. and a porosity of 0%. The proton conductivity of the electrolyte was $2 \times 10^{-4}$ S/cm. The open circuit voltage was 1.0V and, when the test was continued for more than 1 week, no drop of the open circuit voltage was observed.

EXAMPLE 9

An electrolyte was prepared in just the same procedure as in Example 8 except that the weight loss at the time of completing the drying in the step of preparing the dry gel was made 75% based on the weight of the mixed solution and that, as the fuel used in the cell test, a 1:1 methanol-water mixed solution was used in place of the dry hydrogen, and the open circuit voltage was measured.

The heat treatment in the step of preparing the electrolyte from the dry gel was carried out at 1000° C. for 3 hours. The heat-treated electrolyte had water absorption of 4% and a porosity of 4.2%. The proton conductance of the electrolyte was $3 \times 10^{-4}$ S/cm. The open circuit voltage was 1.0V and, when the test was continued for more than 1 week, no drop of the open circuit voltage was observed.

COMPARATIVE EXAMPLE 6

A cell was fabricated by using a joined assembly obtained in the same manner as used in Comparative Example 5 and a 1:1 methanol-water mixed solution as in Example 7.

The open circuit voltage was measured. As a result, it was 0.9V just after the start of the cell test but it rapidly dropped to 0.1V within a few minutes. After completion of the test, the cell was disassembled and the cathode was investigated. As a result, it was found that there was methanol.

Further, the proton conductivity of the electrolyte used in the above cell test was $5 \times 10^{-3}$ S/cm.

COMPARATIVE EXAMPLE 7

A 30 $\mu$m thick electrolyte plate made of an organic compound prepared in the following manner was used as an electrolyte plate.

A dry resin made from a copolymer of $CF_2=CF_2$ and $CF_2=CFOCF_2$ $CF(CF_3)O(CF_2)_2SO_2F$ and having an ion-exchange capacity of 1.0 milliequivalent/g was extruded at 220° C. to form a 50 $\mu$m film. the film was hydrolyzed in a mixed aqueous solution containing 30 wt % dimethylsulfoxide and 15 wt % potassium hydroxide, washed with water and then immersed in 1 N hydrochloric acid. Then the film was washed with water, restrained at four sides thereof by a dedicated tool, and dried at 60° C. for 1 hour, thereby obtaining an ion-exchange membrane for fuel cell.

The resultant ion-exchange membrane had a water absorption of 20% or more and showed a remarkable deformation when immersed.

The ion-exchange membrane was hydrolyzed in the same manner as in Example 1 and then joined on a gas diffusion electrode, thereby obtaining a joined assembly in the same manner as in Example 1.

The joined assembly was built into a performance measurement cell and a continuous discharge test was conducted in the same manner as in Example 1. As a result, the open circuit was 1.0V and the initial terminal voltage was 0.69V at the beginning of the test. But the voltage began to drop from the beginning and discharge became impossible within a few minutes. The joined assembly was investigated and it was confirmed that it was in a dry condition without any water-containing component and it was found that the electrolyte was degraded because of using a dry hydrogen and the cell performance decreased accordingly.

COMPARATIVE EXAMPLE 8

A cell was fabricated in the same manner as in Example 7 except that, as the fuel used in the cell test, a 1:1 methanol-water mixed solution was used in place of the dry hydrogen, and its open circuit voltage was measured. As a result, the open circuit voltage was 0.9V just after the beginning of the test but it rapidly dropped to 0.1V within 10 minutes. After completion of the cell test, the cell was disassembled and the cathode was investigated. As a result, it was found that there was methanol.

COMPARATIVE EXAMPLE 9

An electrolyte plate was prepared in the same manner as in Example 1 except that the burning temperature was changed to 1050° C. The characteristics of the electrolyte plate was evaluated and it was found that its porosity was 0% and its OH group content was 0.2%.

Further, a cell was fabricated in the same manner as in Example 1 using the above-obtained electrolyte plate and its characteristics are evaluated. As a result, it was found that the open circuit voltage was 1.0V and the terminal voltage was 0.1V or less. Also, the proton conductivity of the electrolyte used in the above cell test was $8 \times 10^{-8}$ S/cm.

What is claimed is:

1. A fuel cell comprising;
   a fuel electrode, an oxidant electrode, and an electrolyte membrane interposed between the fuel electrode and the oxidant electrode,
   wherein said electrolyte membrane comprising of a laminate comprising a first film made of a proton-conducting organic compound and a second film made of a proton-conducting inorganic glass, said inorganic glass being provided in contact with said fuel electrode.

2. The fuel cell according to claim 1, wherein said first film made of a proton-conducting organic compound is provided, on opposing two surfaces thereof, with said second film made of a proton-conducting inorganic glass and a third film made of a proton-conducting inorganic glass, respectively.

3. The fuel cell according to claim 2, wherein said second film and said third film made of a proton-conducting inorganic glass each have a porous structure including many pores, the pores on said second film made of a proton-conducting inorganic glass contacting said fuel electrode having a smaller diameter than the pores on said third film made of a proton-conducting inorganic glass.

4. The fuel cell according to claim 1, wherein said first film made of a proton-conducting organic compound has a thickness between 5 $\mu$m and 150 $\mu$m.

5. The fuel cell according to claim 1, wherein said first film made of a proton-conducting organic compound is made of a fluorocarbon polymer having positive-ion exchange groups.

6. The fuel cell according to claim 5, wherein the thickness of said second and third film made of a proton-conducting inorganic glass is in the range of 1 to 70% of that of said first film made of proton-conducting organic compound.

7. The fuel cell according to claim 1, wherein the thickness of said electrolyte membrane is 200 $\mu$m or less.

8. The fuel cell according to claim 1, wherein said second film is a glass-forming oxide selected from a group of $P_2O_5$, $SiO_2$, $B_2O_3$, and $GeO_2$.

9. The fuel cell according to claim 8, wherein said second film is including an oxide selected from a group of an oxide of a metal selected from Al, Ga, Sc, Ti, Zr, Y, V, W, Nb, Mo, In, Sn, Fe, Sb, Bi, Pb, Th, Se, lanthanide, Ni, Cr, Co, Zn, Cu, Ag, Pd, Hf, Ta, Te, Po, Tl, and Cd, the oxides of alkali metals, the oxides of alkaline earth metals, the oxides of high valence-ions, and the mixtures of these metal oxides.

10. The fuel cell according to claim 3, wherein the surface of said second film made of a proton-conducting inorganic glass has pores ranging from 10 to 1,000 nm in diameter and the surface of said third film made of a proton-conducting inorganic glass has pores ranging from 500 to 3,000 nm in diameter.

11. A fuel cell comprising;
    a unit cell comprising a laminate of a plurality of power generation sections, each power generation section comprising a fuel electrode, an oxidant electrode, and an electrolyte membrane interposed between the fuel electrode and the oxidant electrode;
    wherein said electrolyte membrane including of a laminate comprising a first film made of a proton-conducting organic compound and a second film made of a proton-conducting inorganic glass disposed on at least the surface of said first film facing the fuel electrode.

12. The fuel cell according to claim 11, wherein said second film and a third film both made of a proton-conducting inorganic glass is disposed on surfaces of said first film of the proton-conducting organic compound, each of said second and third film made of a proton-conducting inorganic glass having a porous structure including many pores, the pores on the surface of said second and third film made of a proton-conducting inorganic glass contacting said fuel electrode having preferably a smaller average dimension than the pores on the surface contacting said oxidant electrode.

13. A fuel cell comprising;
    an unit cell comprising a laminate of a plurality of power generation sections, each power generation section comprising a fuel electrode, an oxidant electrode, and an electrolyte membrane interposed between the fuel electrode and the oxidant electrode;
    wherein said electrolyte membrane is made of a proton-conducting inorganic glass, and
    wherein said electrolyte membrane has a larger number of pores on the surface facing the oxidant electrode than on the surface facing the fuel electrode.

14. A fuel cell comprising;
    an unit cell comprising a laminate of a plurality of power generation sections, each power generation section comprising a fuel electrode, an oxidant electrode, and an electrolyte membrane interposed between the fuel electrode and the oxidant electrode;
    wherein each of the catalyst layers of said fuel electrode and oxidant electrode has a plurality of catalyst particles and proton-conducting particles, said catalyst particles being electrically connected with each other by said proton-conducting particles, and
    wherein said electrolyte membrane is made of a proton-conducting inorganic glass and has a larger number of pores on the surface facing the oxidant electrode than on the surface facing the fuel electrode.

15. The fuel cell according to claim 14, wherein said proton-conducting particles are inorganic proton-conducting particles.

16. The fuel cell according to claim 14, wherein said electrolyte membrane is made of proton-conducting inorganic glass.

17. The fuel cell according to claim 11, wherein said first film made of a proton-conducting organic compound is made of a fluorocarbon polymer having positive-ion exchange groups.

18. The fuel cell according to claim 11, wherein said electrolyte membrane is a glass-forming oxide selected from a group of $P_2O_5$, $SiO_2$, $B_2O_3$, and $GeO_2$.

19. The fuel cell according to claim 11, wherein said electrolyte membrane is including an oxide selected from a group of an oxide of a metal selected from Al, Ga, Sc, Ti, Zr, Y, V, W, Nb, Mo, In, Sn, Fe, Sb, Bi, Pb, Th, Se, lanthanide, Ni, Cr, Co, Zn, Cu, Ag, Pd, Hf, Ta, Te, Po, Tl, and Cd, the oxides of alkali metals, the oxides of alkaline earth metals, the oxides of high valence-ions, and the mixtures of these metal oxides.

\* \* \* \* \*